United States Patent
Sato et al.

(10) Patent No.: US 7,791,838 B2
(45) Date of Patent: Sep. 7, 2010

(54) MAGNETIC HEAD APPARATUS AND MAGNETIC RECORDING AND REPRODUCING APPARATUS

(75) Inventors: Isamu Sato, Tokyo (JP); Yoshikazu Soeno, Tokyo (JP); Koichi Terunuma, Tokyo (JP); Tetsuya Roppongi, Tokyo (JP); Hiroshi Ikeda, Tokyo (JP)

(73) Assignee: TDK Corporation, Tokyo (JP)

( * ) Notice: Subject to any disclaimer, the term of this patent is extended or adjusted under 35 U.S.C. 154(b) by 761 days.

(21) Appl. No.: 11/790,643

(22) Filed: Apr. 26, 2007

(65) Prior Publication Data

US 2007/0253106 A1 Nov. 1, 2007

(30) Foreign Application Priority Data

Apr. 28, 2006 (JP) .............................. 2006-125802

(51) Int. Cl.
*G11B 5/127* (2006.01)

(52) U.S. Cl. ................................. 360/125.02
(58) Field of Classification Search .................. 360/66, 360/123.02, 123.11, 123.17, 125.02
See application file for complete search history.

(56) References Cited

U.S. PATENT DOCUMENTS

| 4,535,369 | A | * | 8/1985 | Sawazaki ...................... 360/55 |
| 4,677,512 | A | * | 6/1987 | Akiyama et al. ............ 360/110 |
| 6,011,664 | A | * | 1/2000 | Kryder et al. .................. 360/59 |
| 7,256,955 | B2 | * | 8/2007 | Pokhil et al. ................... 360/68 |
| 2008/0151436 | A1 | * | 6/2008 | Sato et al. .................... 360/313 |

FOREIGN PATENT DOCUMENTS

JP  A 2001-250201  9/2001

* cited by examiner

*Primary Examiner*—Angel A. Castro
(74) *Attorney, Agent, or Firm*—Oliff & Berridge, PLC (57) ABSTRACT

A magnetic head apparatus is provided which is capable of recording data in a recoding layer having high coercive force with high accuracy without heating. A magnetic recording and reproducing apparatus is also provided which has the magnetic head apparatus. A recording head has: a main magnetic pole; a recording-side front-end shield (a return magnetic pole); a recording-side rear-end shield (a return magnetic pole); a main coil for generating a perpendicular recording magnetic field at the main magnetic pole; and an auxiliary coil for generating a longitudinal alternating current magnetic field having a frequency in the microwave band at the main magnetic pole.

20 Claims, 7 Drawing Sheets

MAGNETIC HEAD APPARATUS AND MAGNETIC RECORDING AND REPRODUCING APPARATUS

BACKGROUND OF THE INVENTION

1. Field of the Invention

The present invention relates to a magnetic head apparatus for recording magnetic data in a recording layer having high coercive force and to a magnetic recording and reproducing apparatus provided with the same.

2. Description of the Related Art

Conventionally, a significant improvement in the areal density of magnetic recording media such as hard disks is achieved by, for example, reducing the size of magnetic particles constituting the magnetic recording layer, improving materials, or refining the process of a head. Furthermore, in recent years, a perpendicular magnetic recording and reproducing apparatus has come into widespread use in which the improvement in the areal density is achieved by magnetizing a recording layer in the direction perpendicular to the surface of the magnetic recording medium. In addition to this, a further improvement in the areal density is expected in the future.

Meanwhile, as both the size of recording bits and magnetic particles are reduced, thermal fluctuations are more likely to occur. Therefore, it is preferable that magnetic particles having high magnetic anisotropy energy and high coercive force are used as the material for the recording layer.

However, when magnetic particles having high magnetic anisotropy energy are used as the material for a recording layer, the coercive force of the recording layer becomes large, for example, more than 4 kOe. When saturation magnetic recording is performed, it is generally recognized that a recording magnetic field of approximately two times the coercive force is required. Thus, occasionally, the performance of a conventional magnetic head is not sufficient to saturate the magnetization of a recording layer. In other words, the recording and erasing of magnetic data is occasionally difficult to undertake.

In view of the above, a magnetic recording and reproducing apparatus is known (see, for example, Japanese Patent Laid-Open Publication No. 2001-250201) which includes a recording layer which is heated by irradiation with a beam to temporarily reduce the coercive force of the heated portion. A recording magnetic field is simultaneously applied to the heated portion to perform the recording of magnetic data.

However, the magnetic recording and reproducing apparatus provided with, in addition to a magnetic head, a head for irradiation with the beam has a complicated structure and it is therefore difficult to make the apparatus compact.

Furthermore, it is difficult to accurately irradiate a fine target recording portion with the beam and to accurately apply the recording magnetic field thereto.

In addition to this, in the recording layer, not only the portion irradiated with the beam but also the surrounding portion is heated by heat conduction. Further to this, since the temperature distribution of the heated portion and the recording magnetic field distribution of the magnetic head are not uniform, it is difficult to reliably reverse or erase the magnetization in desired target recording portions only. In other words, data recording with high accuracy and high quality is difficult to obtain.

Moreover, since the surroundings of a target recording portion are also heated, thermal fluctuations are therefore likely to be promoted.

Furthermore, in order to temporarily reduce the coercive force by heating, it is preferable to use, as the material for the recording layer, a material in which the coercive force significantly decreases as temperature increases. However, it is necessary to develop such a novel material. In addition to this, even when such a material is employed, thermal fluctuations are likely to occur when the environmental temperature increases.

SUMMARY OF THE INVENTION

In view of the foregoing problems, various exemplary embodiments of this invention provide a magnetic head apparatus capable of recording data in a recording layer having high coercive force with high accuracy without heating, and a magnetic recording and reproducing apparatus provided with the magnetic head apparatus.

Various exemplary embodiments of the present invention achieve the above object by providing a magnetic head apparatus which includes a recording head having: a main magnetic pole; a return magnetic pole; a main coil for generating a perpendicular recording magnetic field at the main pole; and an auxiliary coil for generating a longitudinal alternating current magnetic field having a frequency in the microwave band at the main pole.

In this magnetic head apparatus, the required perpendicular recording magnetic field can be significantly reduced by applying to a recording layer of a magnetic recording medium the longitudinal alternating current magnetic field having a frequency in the microwave band. Therefore, data can be recorded even in a recording layer having high coercive force.

Furthermore, the longitudinal alternating current magnetic field is generated at the main magnetic pole as well as the perpendicular recording magnetic field. Therefore, both the longitudinal alternating current magnetic field and the perpendicular recording magnetic field can be reliably applied to a target recording portion, thereby contributing to an improvement in recording accuracy of data and quality.

Moreover, in this magnetic head apparatus, both the longitudinal alternating current magnetic field and the perpendicular recording magnetic field are generated at the common main magnetic pole. Therefore, the structure of the apparatus is simple, thereby contributing to a reduction in size.

Accordingly, various exemplary embodiments of this invention provide a magnetic head apparatus comprising a recording head including a main magnetic pole; a return magnetic pole; a main coil for generating a perpendicular recording magnetic field at the main pole; and an auxiliary coil for generating a longitudinal alternating current magnetic field having a frequency in a microwave band at the main pole.

In the present application, the term "width direction" is used to refer to a direction corresponding to the direction of the width of a track of a magnetic recording medium serving as a recording target of the magnetic head apparatus. In other words, in the magnetic head apparatus having a suspension arm which is rotatable, the width direction is the direction perpendicular to the lengthwise direction of the suspension arm and to the direction of the axis of rotation.

Furthermore, in the present application, the term "magnetic recording medium" should be understood to include, in addition to hard disks, other magnetic recording media such as magnetic tapes.

According to various exemplary embodiments of the present invention, data can be recorded in a recording layer having high coercive force with high accuracy without heating.

DETAILED DESCRIPTION OF THE PREFERRED EMBODIMENTS

Hereinafter, preferred exemplary embodiments of the present invention are described in detail with reference to the drawings.

Figure 1:
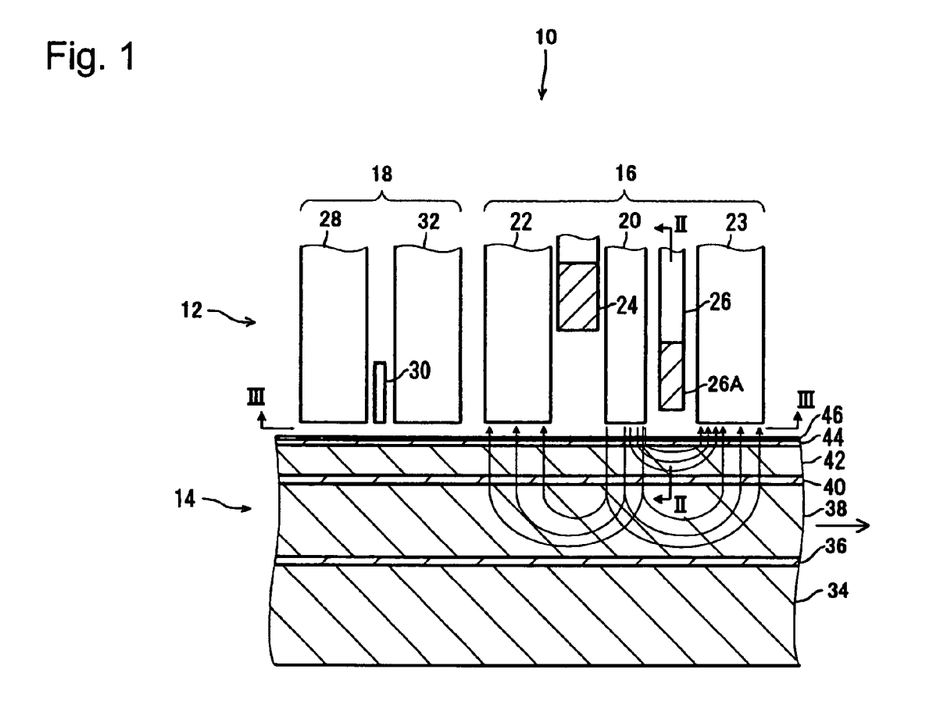
FIG. 1 is a side view including a cross sectional view schematically showing the general structure of a magnetic recording and reproducing apparatus according to a first exemplary embodiment of the present invention.

As shown in FIG. 1, a magnetic recording and reproducing apparatus 10 according to a first exemplary embodiment of the present invention includes a magnetic head apparatus 12 and a magnetic recording medium 14. The magnetic head apparatus 12 has a recording head 16 and a reproducing head 18. The magnetic recording and reproducing apparatus 10 is characterized by the configuration of the recording head 16. The description of the configuration of other parts is appropriately omitted as it is not deemed necessary in order to comprehend the first exemplary embodiment.

The recording head 16 has: a main magnetic pole 20; a recording-side front-end shield (a return magnetic pole) 22; a recording-side rear-end shield (a return magnetic pole) 23; a main coil 24 for generating a perpendicular recording magnetic field at the main magnetic pole 20; and an auxiliary coil 26 for generating a longitudinal alternating current magnetic field having a frequency in the microwave band at the main magnetic pole 20.

The recording head 16 is configured such that the maximum value of the longitudinal alternating current magnetic field is less than the maximum value of the perpendicular recording magnetic field.

As used herein, the perpendicular recording magnetic field is a magnetic field applied to a recording layer 42 of the magnetic recording medium 14 such that the direction of the magnetic field is generally perpendicular to the surface of the magnetic recording medium 14. Furthermore, the longitudinal alternating current magnetic field is a magnetic field applied to the recording layer 42 such that the direction of the magnetic field is generally parallel to the surface of the magnetic recording medium 14.

Figure 2:
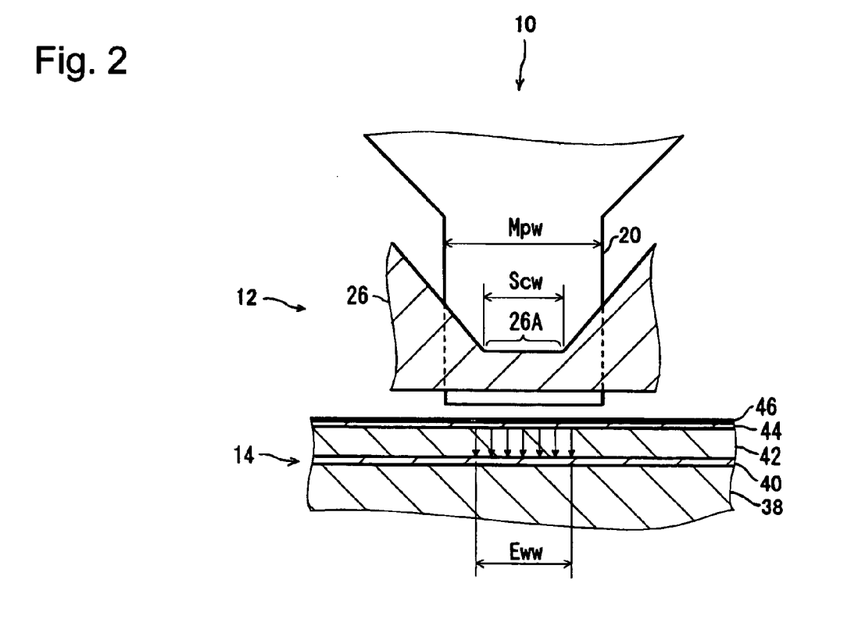
FIG. 2 is a rear view including a cross sectional view taken along the line II-II in FIG. 1.
Figure 3:
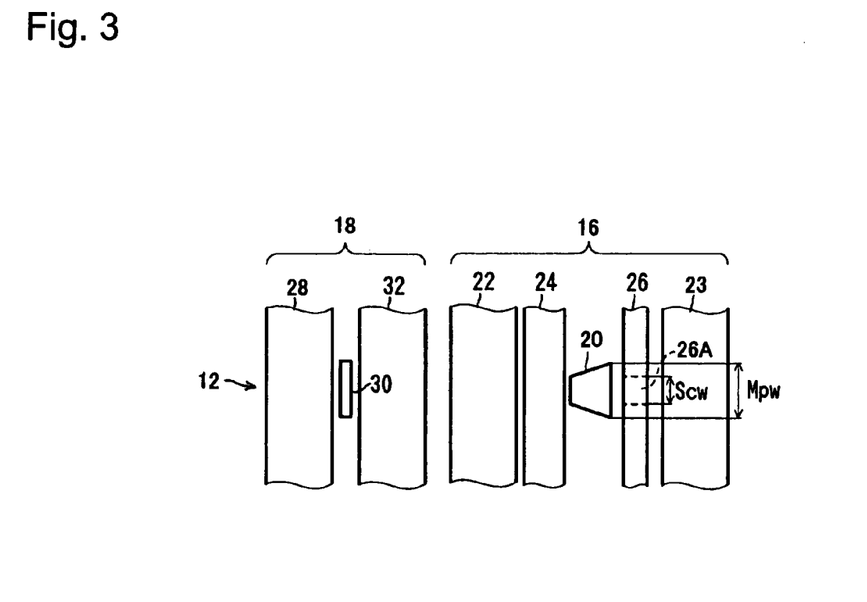
FIG. 3 is a bottom view of a magnetic head apparatus of the magnetic recording and reproducing apparatus, as viewed from the direction indicated by the line III-III in FIG. 1.

As viewed from the recording-side front-end shield 22 side or the recording-side rear-end shield 23 side, the main magnetic pole 20 has a shape shown in FIG. 2. Specifically, the tip end thereof being brought into close proximity to the magnetic recording medium 14 is narrower than the base end thereof, and the width of the tip end is represented by the line labeled Mpw. Furthermore, as viewed from the magnetic recording medium 14 side, the tip end of the main magnetic pole 20 has a generally trapezoidal shape, as shown in FIG. 3. Specifically, the width of the tip end decreases in the direction from the recording-side rear-end shield 23 side toward the recording-side front-end shield 22 side. In addition to this, the width Mpw of the tip end of the main magnetic pole 20 is a width of the surface facing the recording-side rear-end shield 23 (the maximum width of the trapezoid). FIG. 3 is a bottom view of the magnetic head apparatus 12 as viewed from the magnetic recording medium 14 side. Incidentally, the tip end of the main magnetic pole 20 may have a triangular shape.

Meanwhile, the width of the recording-side front-end shield 22 and the recording-side rear-end shield 23 is much larger than the width Mpw of the tip end of the main magnetic pole 20, i.e., it is several tens to several hundreds times larger than the width Mpw. Furthermore, the base end (not shown) of the main magnetic pole 20 is connected to each of the recording-side front-end shield 22 and the recording-side rear-end shield 23. In order to bring the direction of the perpendicular recording magnetic field applied to the recording layer 42 closer to the direction perpendicular to the surface of the magnetic recording medium 14, the gap between the main magnetic pole 20 and the recording-side front-end shield 22 is preferably 1 μm or more. Furthermore, the gap between the main magnetic pole 20 and the recording-side rear-end shield 23 is preferably in the range of 10 to 100 nm and more preferably approximately 50 nm.

The main coil 24 is disposed on the recording-side front-end shield 22 side of the main magnetic pole 20 so as to surround a connection portion (not shown) of the main magnetic pole 20 and the recording-side front-end shield 22. In FIG. 1, the main coil 24 is a one-winding coil. However, no particular limitation is imposed on the number of turns of the main coil, and accordingly the number of windings may be two or more. Furthermore, in FIG. 1, the main coil 24 is a single-layer coil, but it should be appreciated that the main coil 24 may also be a multilayer coil.

The auxiliary coil 26 is disposed on the recording-side rear-end shield 23 side of the main magnetic pole 20 so as to surround a connection portion (not shown) of the main magnetic pole 20 and the recording-side rear-end shield 23. A part of the auxiliary coil 26 is disposed between the main magnetic pole 20 and the recording-side rear-end shield 23. The thickness of the auxiliary coil 26 (being the thickness in the direction of the gap between the main magnetic pole 20 and the recording-side rear-end shield 23) is preferably in the range of 10 to 50 nm. Furthermore, the tip end of the main magnetic pole 20, whose end is on the magnetic recording medium 14 side, is polished in a manufacturing process. Thus, in order to prevent the auxiliary coil 26 from being polished, it is preferable that the tip end of the auxiliary coil 26, whose end is on the magnetic recording medium 14 side, be recessed from the tip end of the main magnetic pole 20 by approximately 10 nm or more in a direction away from the magnetic recording medium 14.

The auxiliary coil 26 has an alternating current magnetic field-transferring portion 26A provided at a position facing the main magnetic pole 20. This transferring portion 26A has a generally constant cross sectional shape (a rectangular shape in the first exemplary embodiment, see FIG. 1) perpendicular to the width direction. Further to this, as shown in FIG. 2, the alternating current magnetic field-transferring portion 26A is generally parallel to the width direction, and the area of the cross sectional shape is less than that of the other portions of the auxiliary coil 26. A width Scw of the alternating current magnetic field-transferring portion 26A of the auxiliary coil 26 is less than the width Mpw of the tip end of the main magnetic pole 20.

In FIG. 1, the auxiliary coil 26 is a single-winding coil. However, no particular limitation is imposed on the number of windings of the auxiliary coil, and the number of windings may be two or more. Furthermore, in FIG. 1, the auxiliary coil 26 is a single-layer coil but may be a multilayer coil. Thus, by increasing the number of windings and the number of layers of the auxiliary coil 26,e the longitudinal alternating current magnetic field can be increased while suppressing the electrical current supplied to the auxiliary coil 26.

Figure 4:
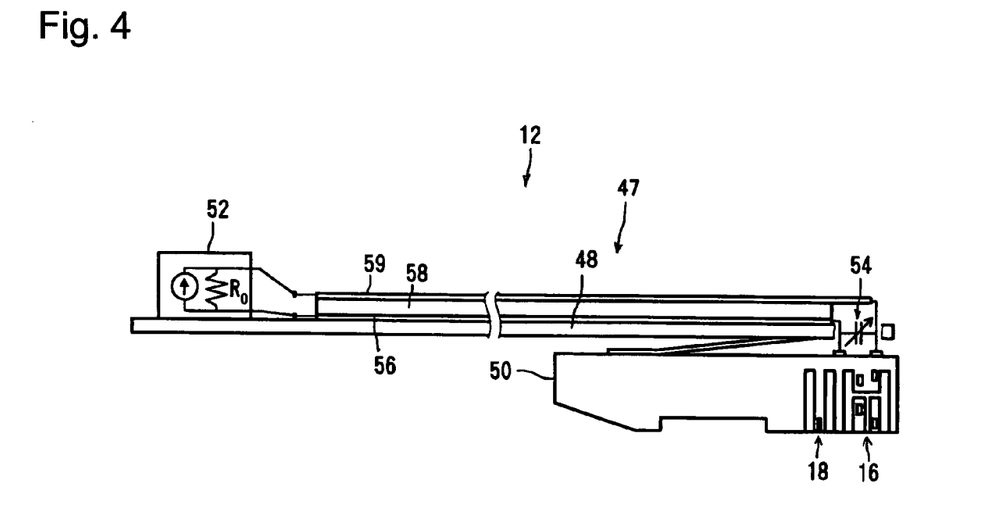
FIG. 4 is a side view including a cross sectional view schematically showing the general structure of the magnetic head apparatus.

As shown in FIG. 4, the magnetic head apparatus 12 has an auxiliary coil-use electrical circuit 47 including the auxiliary coil 26 and provided for supplying an alternating current to the auxiliary coil 26. The auxiliary coil-use electrical circuit 47 is provided with an auxiliary coil driving unit 52 for supplying to the auxiliary coil 26 an alternating current having a frequency in the microwave band in the range of 1 to 15 GHz.

The auxiliary coil-use electrical circuit 47 constitutes an oscillation circuit for generating an alternating current having a frequency in the microwave band in the range of 1 to 15 GHz.

The magnetic head apparatus 12 has a suspension arm 48 and a slider 50 attached to a tip end of the suspension arm 48, and the recording head 16 and the reproducing head 18 are disposed in the slider 50.

The auxiliary coil driving unit 52 is attached near the base end of the suspension arm 48. Furthermore, a conductive layer 56, an insulating layer 58, and a conductive layer 59 are stacked in that order on the suspension arm 48, and the auxiliary coil driving unit 52 is electrically connected to the auxiliary coil 26 through the conductive layers 56 and 59 constituting a planar waveguide.

Further to this, the auxiliary coil-use electrical circuit 47 has a variable capacitor (impedance adjusting element) 54 in the vicinity of the slider 50. The resonance frequency of the auxiliary coil-use electrical circuit 47 is closer to the ferromagnetic resonance frequency of the recording layer 42 of the magnetic recording medium 14 than the resonance frequency of a virtual electrical circuit formed by removing the variable capacitor 54 from the auxiliary coil-use electrical circuit 47.

The total capacitance of the electrostatic capacitance of the variable capacitor and the stray capacitance of wiring is denoted as C, and the equivalent inductance of the auxiliary coil 26 is denoted as L. Then, the resonance frequency $f_0$ of the auxiliary coil-use electrical circuit 47 is given by $$f_0 = 2\pi/\sqrt{(CL)}.$$

Furthermore, the direct current resistance of the auxiliary coil-use electrical circuit 47 is denoted as Rc, and the impedance of the conductive layers 56 and 59 constituting the planar waveguide is denoted as $Z_0$. Then, it is preferable that $$Rc = Z_0.$$

In this manner, the reflectance of an alternating current at a frequency of $f_0$ approaches 0, and thus the alternating current having a high frequency in the microwave band can be efficiently supplied to the auxiliary coil 26.

The reproducing head 18 has a reproducing-side front-end shield 28, a magnetic-resistance element 30, and a reproducing-side rear-end shield 32.

Specifically, the magnetic-resistance element 30 is a TMR element or a GMR element and is disposed between the reproducing-side front-end shield 28 and the reproducing-side rear-end shield 32.

Incidentally, the magnetic head apparatus 12 is also provided with a main coil-use electrical circuit for supplying a direct current to the main coil 24 and a reproducing-use electrical circuit for detecting a change in the resistance value of the magnetic-resistance element 30. However, the description of these circuits is not included as it is not deemed necessary in order to comprehend the first exemplary embodiment.

The magnetic recording medium 14 has a substrate 34, an underlayer 36, a soft magnetic layer 38, a seed layer 40, the recording layer 42, a protecting layer 44, and a lubricating layer 46 and has a configuration in which these layers are stacked in that order over the substrate 34. The material for the recording layer 42 has a perpendicular magnetic anisotropy energy of $1 \times 10^6$ erg/cc or more. For example, a CoCrPt alloy may be employed as the preferred material for the recording layer 42. The ferromagnetic resonance frequency of the recording layer 42 is a value which is intrinsic to a material and is determined by the shape, constituent elements, and the like of magnetic particles constituting the recording layer 42. The ferromagnetic resonance frequency is in the range of approximately 1 to 15 GHz. The recording layer 42 may have only one ferromagnetic resonance frequency or may have a plurality of ferromagnetic resonance frequencies.

Furthermore, the magnetic recording medium 14 is attached to a rotation mechanism (not shown) so as to rotate in the direction indicated by the arrow shown in FIG. 1 (the right direction in FIG. 1).

A description will now be given of the operation of the magnetic recording and reproducing apparatus 10.

In the magnetic recording and reproducing apparatus 10, when a direct current is supplied to the main coil 24, the main coil 24 generates a direct current magnetic field. This direct current magnetic field passes through the main magnetic pole 20, the soft magnetic layer 38 of the magnetic recording medium 14, the recording-side front-end shield 22, and the recording-side rear-end shield 23. Thus, a perpendicular recording magnetic field in the direction perpendicular to the surface of the magnetic recording medium 14 is applied to the recording layer 42.

Meanwhile, when the auxiliary coil-use electrical circuit 47 supplies to the auxiliary coil 26 an alternating current having a frequency in the microwave band in the range of 1 to 15 GHz, the auxiliary coil 26 generates an alternating current magnetic field. This alternating current magnetic field is transferred mainly from the alternating current magnetic field-transferring portion 26A to the main magnetic pole 20 and the recording-side rear-end shield 23. Since this alternating current magnetic field is a high frequency field, the skin effect occurs when this magnetic field penetrates the main magnetic pole 20 and the recording-side rear-end shield 23. That is, the alternating current magnetic field penetrates the main magnetic pole 20 and the recording-side rear-end shield 23 only in portions close to the surfaces thereof facing the alternating current magnetic field-transferring portion 26A. For example, when the frequency is approximately 10 GHz, the alternating current magnetic field penetrates the main magnetic pole 20 and the recording-side rear-end shield 23 only in portions approximately 50 nm from the surface thereof facing the alternating current magnetic field-transferring portion 26A. Hence, the alternating current magnetic field generated by the auxiliary coil 26 is generated only in the small width portions in the main magnetic pole 20 and the recording-side rear-end shield 23. Therefore, in contrast to the direct current magnetic field, the alternating current magnetic field only reaches only to a shallow depth in the magnetic recording medium 14. Therefore, the alternating current magnetic field generated by the auxiliary coil 26 passes through the main magnetic pole 20, the recording layer 42, and the recording-side rear-end shield 23 so as to penetrate the recording layer 42 in a direction generally parallel to the surface of the magnetic recording medium 14. In this instance, the strength of the longitudinal alternating current magnetic field is preferably in the range of approximately 0.1 to 0.2 Hk (Hk: an anisotropic magnetic field). Furthermore, the frequency of the longitudinal alternating current magnetic field is more preferably in the range of approximately several GHz to about 10 GHz.

Hence, by applying to the recording layer 42 the longitudinal alternating current magnetic field having a frequency in the microwave band, the required recording magnetic field in the perpendicular direction can be significantly reduced. For example, by applying the longitudinal alternating current magnetic field, the strength of the perpendicular magnetic field capable of reversing the magnetization of the recording layer 42 can be reduced by approximately 40%, and that can be approximately 60% when compared to that before the longitudinal alternating current magnetic field is applied. Therefore, although the material for the recording layer 42 has a perpendicular magnetic anisotropy energy of $1\times10^6$ erg/cc or more and the coercive force of the recording layer 42 is high, the magnetization of a target recording portion of the recording layer 42 can be reversed or erased by application of the perpendicular recording magnetic field. For example, even when the coercive force of the recording layer 42 is approximately 4 kOe before the longitudinal alternating current magnetic field is applied, the coercive force of the recording layer 42 is substantially reduced to approximately 2.4 kOe by applying the longitudinal alternating current magnetic field. Therefore, the magnetization of a target recording portion of the recording layer 42 can be reversed or erased.

Furthermore, the longitudinal alternating current magnetic field is generated at the main magnetic pole 20 as well as the perpendicular recording magnetic field. Thus, both the longitudinal alternating current magnetic field and the perpendicular recording magnetic field can be reliably applied to a target recording portion, thereby contributing to an improvement in the recording accuracy of data and quality.

When the longitudinal alternating current magnetic field is excessively large, the time required to reverse the magnetization of the recording layer 42 by the perpendicular recording magnetic field may become lengthy. However, since the magnetic head apparatus 12 is configured such that the maximum value of the longitudinal alternating current magnetic field is less than the maximum value of the perpendicular recording magnetic field, the magnetization of a target recording portion can be reversed or erased efficiently.

Further to this, the magnetic head apparatus 12 has a simple structure since both the longitudinal alternating current magnetic field and the perpendicular recording magnetic field are generated at the common main magnetic pole 20, thereby contributing to the reduction in size.

The effective recording width Eww of the recording head 16 is the width of a region in the recording layer 42 in which the coercive force is less than the strength of the perpendicular recording magnetic field when both the perpendicular recording magnetic field and the longitudinal alternating current magnetic field are applied to that region. The effective recording width Eww is slightly larger than the smaller one of the width Scw of the alternating current magnetic field-transferring portion 26A of the auxiliary coil 26 and the width Mpw of the tip end of the main magnetic pole 20. In other words, the effective recording width Eww can be reduced by reducing one of the width Scw of the alternating current magnetic field-transferring portion 26A of the auxiliary coil 26 and the width Mpw of the tip end of the main magnetic pole 20, whereby the areal density can be increased.

As shown in FIG. 2, in the first exemplary embodiment, the effective recording width Eww is reduced to less than the width Mpw of the tip end of the main magnetic pole 20 by reducing the width Scw of the alternating current magnetic field-transferring portion 26A of the auxiliary coil 26. Thus, the process of the tip end of the main magnetic pole 20 is facilitated accordingly, thereby contributing to an improvement in the productivity of the main magnetic pole 20.

Furthermore, the auxiliary coil-use electrical circuit 47 has the variable capacitor (impedance adjusting element) 54 in the vicinity of the slider 50. The resonance frequency of the auxiliary coil-use electrical circuit 47 is closer to the ferromagnetic resonance frequency of the recording layer 42 of the magnetic recording medium than the resonance frequency of a virtual electrical circuit formed by removing the variable capacitor 54 from the auxiliary coil-use electrical circuit 47. Therefore, a longitudinal alternating current magnetic field having a frequency close to the ferromagnetic resonance frequency is applied to the recording layer 42, and thus the coercive force of the recording layer 42 can be reduced efficiently and reliably.

Preferably, the resonance frequency of the auxiliary coil-use electrical circuit 47 is coincident with the ferromagnetic resonance frequency of the recording layer 42. However, even when the resonance frequency of the auxiliary coil-use electrical circuit 47 is slightly different from the ferromagnetic resonance frequency of the recording layer 42, the required recording magnetic field in the perpendicular direction can be significantly reduced.

Furthermore, as the impedance adjusting element, a variable inductor may be provided in the auxiliary coil-use electrical circuit, in place of the variable capacitor 54. In this manner, the resonance frequency of the auxiliary coil-use electrical circuit may be brought closer to the ferromagnetic resonance frequency of the recording layer of the magnetic recording medium than the resonance frequency of a virtual electrical circuit formed by removing the variable inductor from the auxiliary coil-use electrical circuit. Moreover, as the impedance adjusting element, a variable inductor may be provided in the auxiliary coil-use electrical circuit, in addition to the variable capacitor 54. In this manner, the resonance frequency of the auxiliary coil-use electrical circuit may be brought closer to the ferromagnetic resonance frequency of the recording layer of the magnetic recording medium than the resonance frequency of a virtual electrical circuit formed by removing the variable capacitor 54 and the variable inductor from the auxiliary coil-use electrical circuit. Alternatively, a non-variable capacitor having a constant electrostatic capacitance and/or a non-variable inductor having a constant inductance may be provided in the auxiliary coil-use electrical circuit. In this manner, the resonance frequency of the auxiliary coil-use electrical circuit may be brought closer to the ferromagnetic resonance frequency of the recording layer of the magnetic recording medium than the resonance frequency of a virtual electrical circuit formed by removing the capacitor and/or the inductor from the auxiliary coil-use electrical circuit.

Moreover, in the magnetic recording and reproducing apparatus 10, since the material for the recording layer 42 has a perpendicular magnetic anisotropy energy of $1 \times 10^6$ erg/cc or more and the coercive force of the recording layer 42 is high, the magnetization is less likely to be reversed due to thermal fluctuations. Therefore, the storage characteristics of data are excellent, and the reliability of the data is high.

Furthermore, since the reproducing head 18 of the magnetic head apparatus 12 has the magnetic-resistance element 30 which is one of a TMR element and a GMR element, recorded magnetic data can be reproduced with high accuracy.

A description will now be given of a second exemplary embodiment of the present invention.

In contrast to the first exemplary embodiment, in the second exemplary embodiment, a recording-side rear-end shield 60 is provided in place of the recording-side rear-end shield 23. The recording-side rear-end shield 60 has a shape shown in FIG. 5. Specifically, a base end portion 60B is narrower than a tip end portion 60A on the magnetic recording medium 14 side, and the tip end portion 60A is protruded from the base end portion 60B toward the main magnetic pole 20 side. Further to this, a middle portion 60C between the tip end portion 60A and the base end portion 60B is continuously tapered from the tip end portion 60A to the base end portion 60B. Furthermore, an auxiliary coil 62 is provided in place of the auxiliary coil 26 of the first exemplary embodiment. Between the main magnetic pole 20 and the recording-side rear-end shield 60, the auxiliary coil 62 has a cross sectional thickness (a thickness in a direction of the gap between the main magnetic pole 20 and the recording-side rear-end shield 60) larger than that of the auxiliary coil 26. This auxiliary coil 62 is disposed between the base end portion 60B of the recording-side rear-end shield 60 and the main magnetic pole 20. Since the configuration of the other components is the same as that of the first exemplary embodiment, the same reference numerals as those employed in FIG. 1 are employed for the same components, and the description thereof will be omitted.

Figure 5:
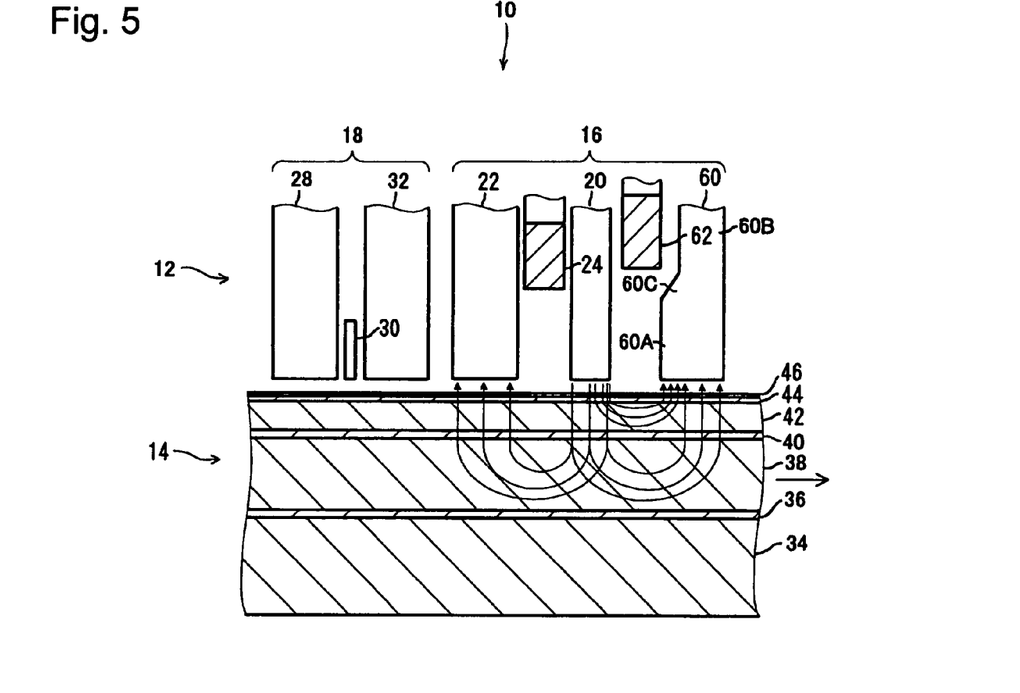
FIG. 5 is a side view including a cross sectional view schematically showing the general structure of a magnetic recording and reproducing apparatus according to a second exemplary embodiment of the present invention.

As described above, in the recording-side rear-end shield 60, the base end portion 60B is narrower than the tip end portion 60A, and the auxiliary coil 62 is disposed between the base end portion 60B of the recording-side rear-end shield 60 and the main magnetic pole 20. Thus, the thickness of the auxiliary coil 62 can be increased. Hence, the heat generation of the auxiliary coil 62 can be suppressed. In addition to this, the width of the gap between the tip end portion 60A of the recording-side rear-end shield 60 and the main magnetic pole 20 can be set to a desired value without being constrained by the thickness of the auxiliary coil 62.

A description will now be given of a third exemplary embodiment of the present invention.

Figure 6:
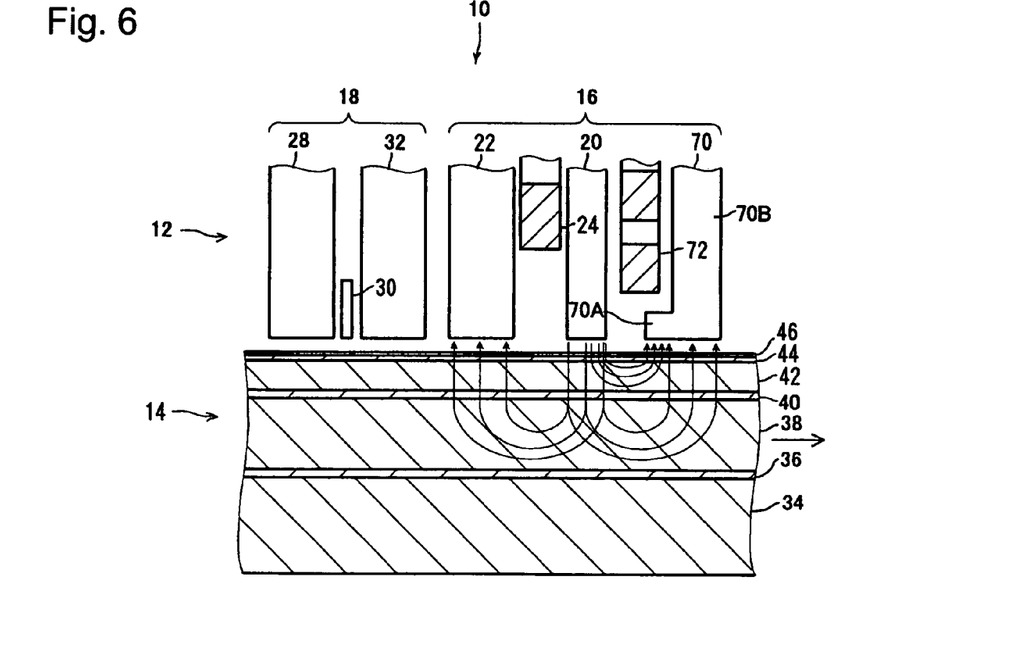
FIG. 6 is a side view including a cross sectional view schematically showing the general structure of a magnetic recording and reproducing apparatus according to a third exemplary embodiment of the present invention.

In contrast to the first exemplary embodiment, in the third exemplary embodiment, a recording-side rear-end shield 70 having a stepped shape is provided in place of the recording-side rear-end shield 23, as shown in FIG. 6. Specifically, a base end portion 70B is narrower than a tip end portion 70A on the magnetic recording medium 14 side, and the tip end portion 70A is protruded from the base end portion 70B toward the main magnetic pole 20 side. Furthermore, an auxiliary coil 72 is provided in place of the auxiliary coil 26 of the first exemplary embodiment. Between the main magnetic pole 20 and the recording-side rear-end shield 70, the auxiliary coil 72 has a cross sectional thickness (a thickness in a direction of the gap between the main magnetic pole 20 and the recording-side rear-end shield 70) larger than that of the auxiliary coil 26. This auxiliary coil 72 is disposed between the base end portion 70B of the recording-side rear-end shield 70 and the main magnetic pole 20. Furthermore, the auxiliary coil 72 is a two-winding coil. Since the configuration of the other components is the same as that of the first exemplary embodiment, the same reference numerals as those employed in FIG. 1 are employed for the same components, and the description thereof will be omitted.

As described above, also in the recording-side rear-end shield 70, the base end portion 70B is narrower than the tip end portion 70A, and the auxiliary coil 72 is disposed between the base end portion 70B of the recording-side rear-end shield 70 and the main magnetic pole 20. Hence, as in the second embodiment, the thickness of the auxiliary coil 72 can be increased. Furthermore, the recording-side rear-end shield 70 has the stepped shape which does not have a middle portion between the tip end portion 70A and the base end portion 70B. Accordingly, the length of the base end portion 70B can be increased in the direction perpendicular to the surface of the magnetic recording medium 14, and thus the number of windings of the auxiliary coil 72 can be increased. Furthermore, the auxiliary coil 72 can be extended in the direction perpendicular to the surface of the magnetic recording medium 14. In this manner, the strength of the longitudinal alternating current magnetic field can be increased while suppressing heat generation of the auxiliary coil 72. Furthermore, as in the second exemplary embodiment, the width of the gap between the tip end portion 70A of the recording-side rear-end shield 70 and the main magnetic pole 20 can be set to a desired value without being constrained by the thickness of the auxiliary coil 72.

A description will now be given of a fourth exemplary embodiment of the present invention.

Figure 7:
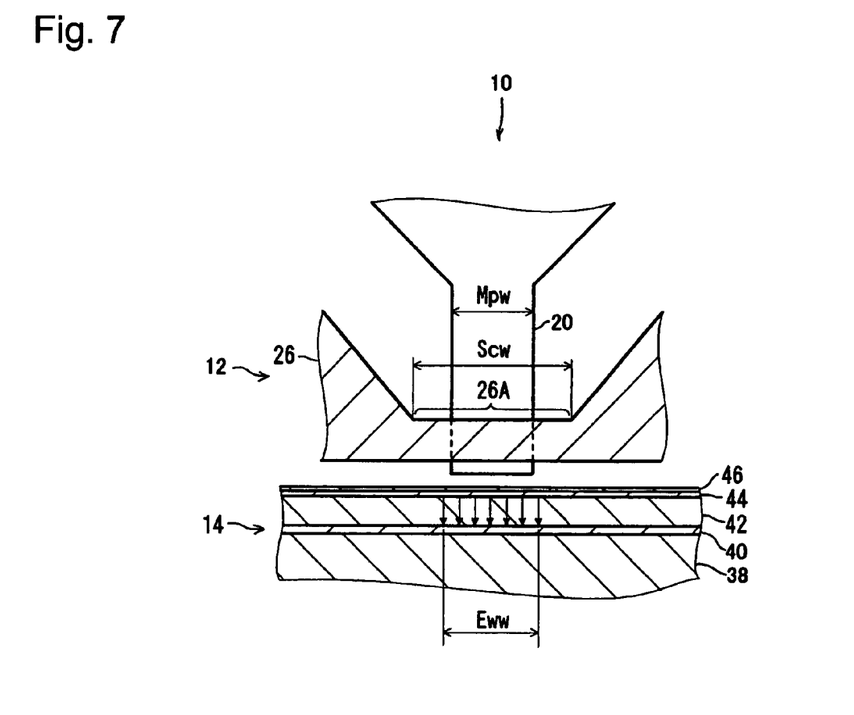
FIG. 7 is a rear view including a cross sectional view schematically showing the general structure of a main magnetic pole and an auxiliary coil of a magnetic recording and reproducing apparatus according to a fourth exemplary embodiment of the present invention.

In contrast to the first exemplary embodiment, in the fourth exemplary embodiment, the width Mpw of the tip end of the main magnetic pole 20 is less than the width Scw of the alternating current magnetic field-transferring portion 26A of the auxiliary coil 26, as shown in FIG. 7. Since the configuration of the other components is the same as that of the first exemplary embodiment, the same reference numerals as those employed in FIGS. 1 and 2 are employed for the same components, and the description thereof will be omitted.

By reducing the width Mpw of the tip end of the main magnetic pole 20, the effective recording width Eww is made smaller than the width Scw of the alternating current magnetic field-transferring portion 26A of the auxiliary coil 26. Therefore, the process of the alternating current magnetic field-transferring portion 26A of the auxiliary coil 26 is facilitated accordingly, thereby contributing to an improvement in the productivity of the auxiliary coil 26.

In other words, when the process of the main magnetic pole is easier than that of the auxiliary coil, it is better to make the width Mpw of the tip end of the main magnetic pole smaller than the width Scw of the alternating current magnetic field-transferring portion of the auxiliary coil, as in the fourth exemplary embodiment. Conversely, when the process of the auxiliary coil is easier than that of the main magnetic pole, it is better to make the width Scw of the alternating current magnetic field-transferring portion of the auxiliary coil smaller than the width Mpw of the tip end of the main magnetic pole, as in the first exemplary embodiment. Alternatively, when the degree of difficulty in processing the main magnetic pole is the same as that in processing the auxiliary coil, the width Scw of the alternating current magnetic field-transferring portion of the auxiliary coil may be the same as the width Mpw of the tip end of the main magnetic pole.

A description will now be given of a fifth exemplary embodiment of the present invention.

Figure 8:
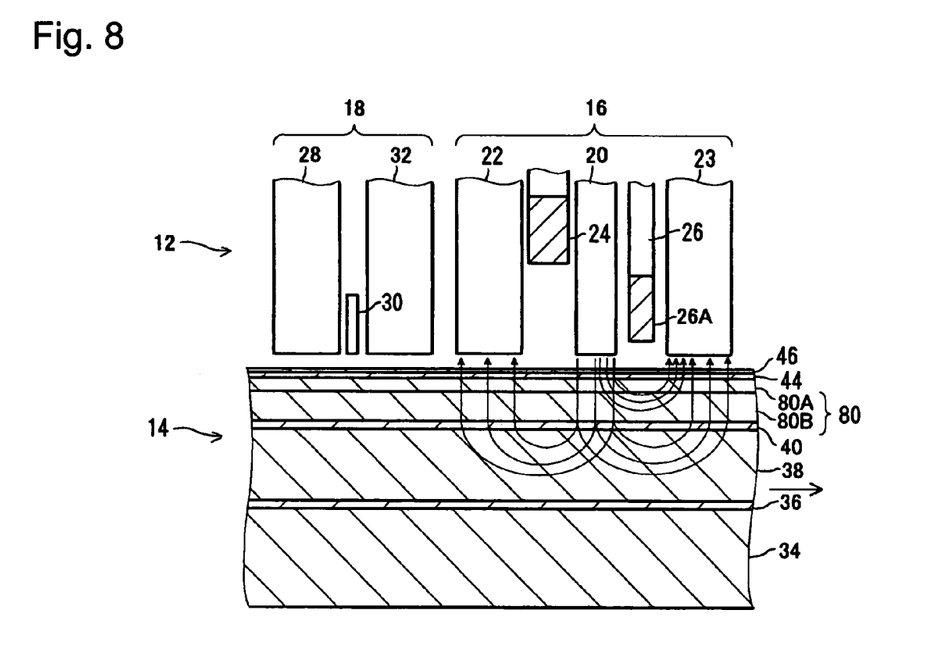
FIG. 8 is a side view including a cross sectional view schematically showing the general structure of a recording layer of a magnetic recording and reproducing apparatus according to a fifth exemplary embodiment of the present invention.

In contrast to the first exemplary embodiment, in the fifth exemplary embodiment, a recording layer 80 of the magnetic recording medium 14 has an upper recording layer 80A and a lower recording layer 80B, as shown in FIG. 8. Since the configuration of the other components is the same as that of the first exemplary embodiment, the same reference numerals as those employed in FIG. 1 are employed for the same components, and the description thereof will be omitted.

The material for the upper recording layer 80A is a soft magnetic material or a magnetic material having a magnetic anisotropy in a perpendicular direction of $1 \times 10^5$ erg/cc or less.

The composition of the lower recording layer 80B is the same as the configuration of the recording layer 42 of the first exemplary embodiment.

As described above, the upper recording layer 80A is provided above the lower recording layer 80B, whereby the direction of the perpendicular recording magnetic field applied to the lower recording layer 80B can be brought even closer to the direction perpendicular to the surface of the magnetic recording medium 14.

Alternatively, the perpendicular magnetic anisotropy of the upper recording layer 80A may be higher than that of the lower recording layer 80B. In such a configuration, a steeper magnetic transition is formed. Incidentally, the strength of the recording magnetic field is higher at an upper layer. Therefore, even when the perpendicular magnetic anisotropy of the upper recording layer 80A is high, the magnetization of the upper recording layer 80A can be reversed.

A description will now be given of a sixth exemplary embodiment of the present invention.

Figure 9:
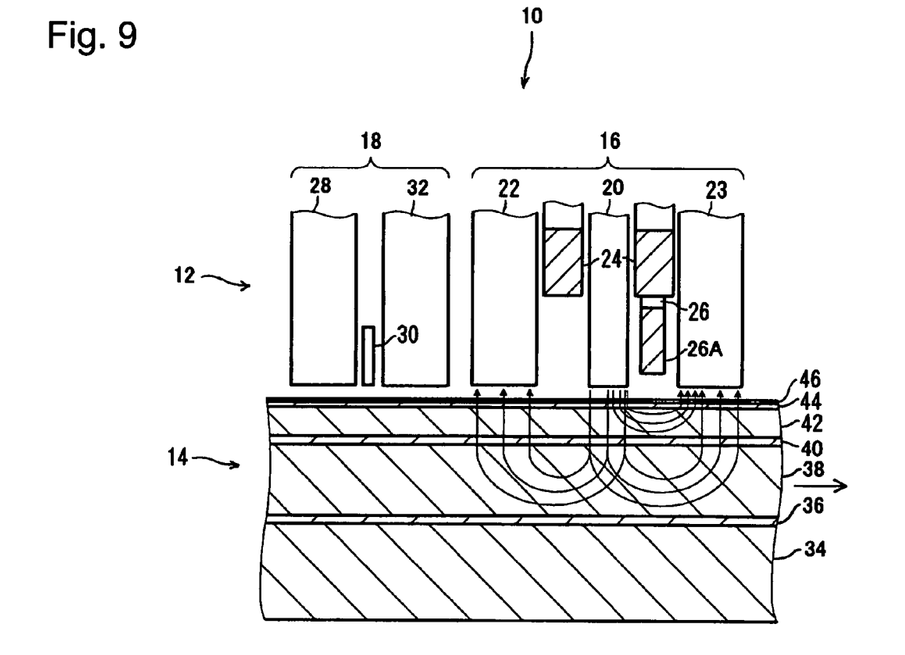
FIG. 9 is a side view including a cross sectional view schematically showing the general structure of a magnetic recording and reproducing apparatus according to a sixth exemplary embodiment of the present invention.

In contrast to the first exemplary embodiment, in the sixth exemplary embodiment, the main coil 24 is disposed on the both sides of the main magnetic pole 20, as shown in FIG. 9. Moreover, on the recording-side rear-end shield 23 side of the main magnetic pole 20, a portion of the auxiliary coil 26 which faces the main magnetic pole 20 is disposed closer to the magnetic recording medium 14 than is a portion of the main coil 24 which faces the main magnetic pole 20. Since the configuration of the other components is the same as that of the first exemplary embodiment, the same reference numerals as those employed in FIG. 1 are employed for the same components, and the description thereof will be omitted.

Hence, by disposing the main coil 24 on both sides of the main magnetic pole 20, the strength of the perpendicular recording magnetic field can be increased while suppressing the heat generation of the main coil 24.

A description will now be given of a seventh exemplary embodiment of the present invention.

Figure 10:
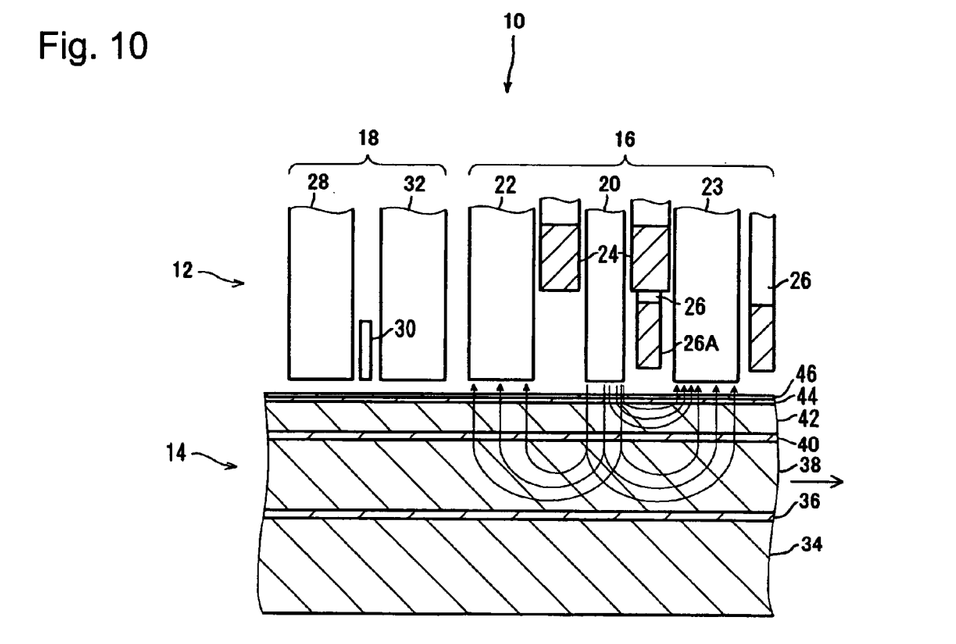
FIG. 10 is a side view including a cross sectional view schematically showing the general structure of a magnetic recording and reproducing apparatus according to a seventh exemplary embodiment of the present invention.

In contrast to the sixth exemplary embodiment, in the seventh exemplary embodiment, the auxiliary coil 26 is disposed on the both sides of the recording-side rear-end shield 23, as shown in FIG. 10. Since the configuration of the other components is the same as that of the sixth exemplary embodiment, the same reference numerals as those employed in FIG. 9 are employed for the same components, and the description thereof will be omitted.

As described above, by disposing the auxiliary coil 26 on the both sides of the recording-side rear-end shield 23, the strength of the longitudinal alternating current magnetic field can be increased while suppressing the heat generation of the auxiliary coil 26.

In the seventh exemplary embodiment, the frequency of the longitudinal alternating current magnetic field is preferably in the range of 1 to 5 GHz which produces a relatively small skin effect.

A description will now be given of an eighth exemplary embodiment of the present invention.

Figure 11:
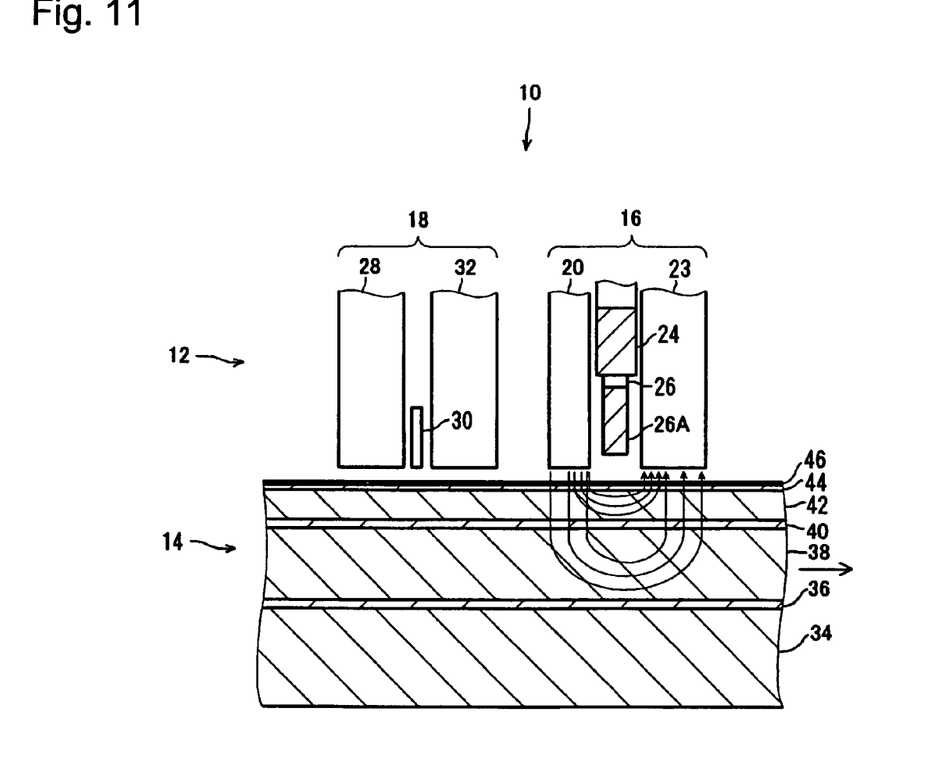
FIG. 11 is a side view including a cross sectional view schematically showing the general structure of a magnetic recording and reproducing apparatus according to an eighth exemplary embodiment of the present invention.

In contrast to the sixth exemplary embodiment, in the eighth exemplary embodiment, the main coil 24 disposed on the recording-side front-end shield 22 side of the main magnetic pole 20 and the recording-side front-end shield 22 are omitted as shown in FIG. 11. Since the configuration of the other components is the same as that of the sixth exemplary embodiment, the same reference numerals as those employed in FIG. 9 are employed for the same components, and the description thereof will be omitted.

As described above, by omitting the main coil on the recording-side front-end shield side and the recording-side front-end shield, the magnetic head apparatus can be made compact.

Alternatively, in contrast to the sixth exemplary embodiment, the main coil 24 disposed on the recording-side rear-end shield 23 side of the main magnetic pole 20 and the recording-side rear-end shield 23 may be omitted, and the auxiliary coil 26 may be disposed between the main magnetic pole 20 and the recording-side front-end shield 22. Also in this case, the magnetic head apparatus can be made compact.

A description will now be given of a ninth exemplary embodiment of the present invention.

Figure 12:
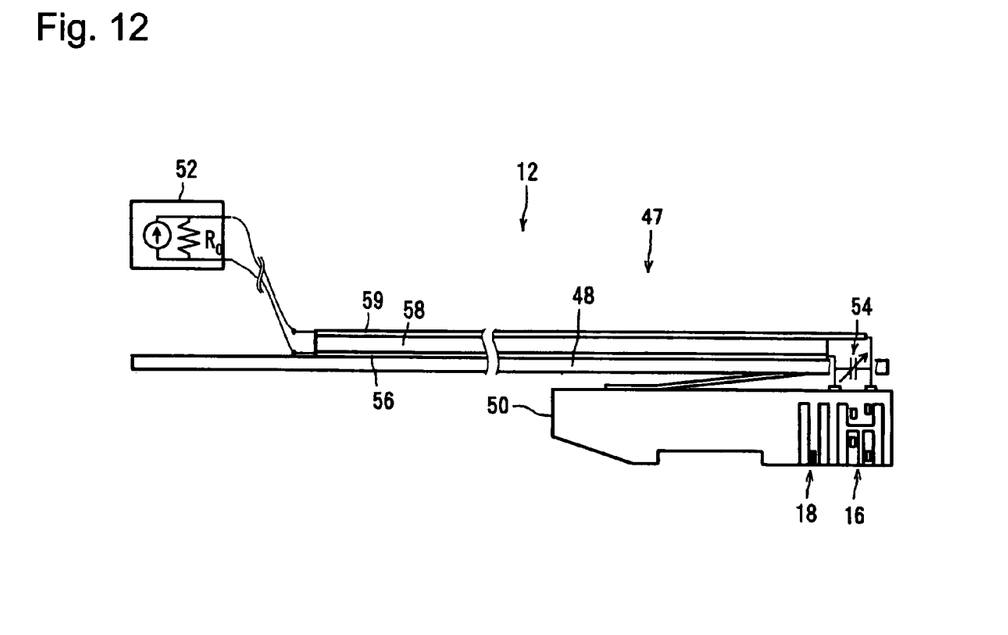
FIG. 12 is a side view including a cross sectional view schematically showing the general structure of a magnetic head apparatus of a magnetic recording and reproducing apparatus according to a ninth exemplary embodiment of the present invention.

In contrast to the first exemplary embodiment, in the ninth exemplary embodiment, the auxiliary coil driving unit 52 is disposed so as to be separated from the suspension arm 48, as shown in FIG. 12. Since the configuration of the other components is the same as that of the first exemplary embodiment, the same reference numerals as those employed in FIGS. 1 and 4 are employed for the same components, and the description thereof will be omitted.

As described above, the auxiliary coil driving unit 52 is disposed so as to be separated from the suspension arm 48. Therefore, the mass of a portion rotated together with the suspension arm 48 is reduced, and thus the effect of stabilizing the motion of the suspension arm 48 can be obtained.

A description will now be given of a tenth exemplary embodiment of the present invention.

Figure 13:
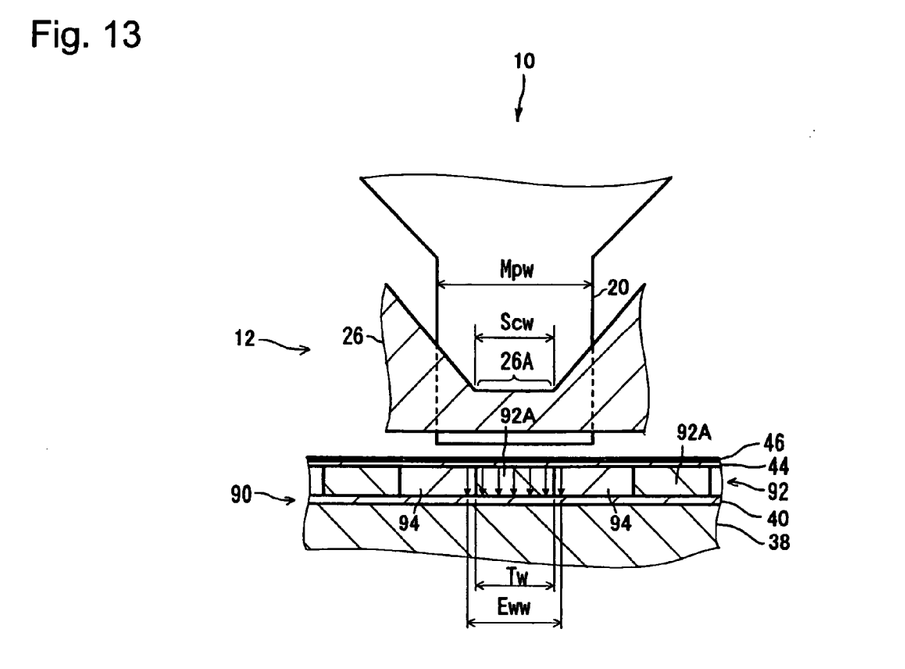
FIG. 13 is a rear view including a cross sectional view schematically showing the general structure of a magnetic recording and reproducing apparatus according to a tenth exemplary embodiment of the present invention.

In contrast to the first exemplary embodiment, in the tenth exemplary embodiment, a magnetic recording medium 90 is provided in place of the magnetic recording medium 14 provided with the recording layer 42 having a continuous film-like shape, as shown in FIG. 13. The magnetic recording medium 90 has a recording layer 92 having a concavo-convex pattern in which track portions are recording elements 92A of convex portions. The magnetic recording medium 90 is a discrete track medium or a patterned medium. Furthermore, a non-magnetic material 94 is filled in concave portions between the recording elements 92A. Since the configuration of the other components is the same as that of the first exemplary embodiment, the same reference numerals as those employed in FIGS. 1 and 2 are employed for the same components, and the description thereof will be omitted.

As described above, the effective recording width Eww of the recording head 16 is closer to the smaller one of the width Scw of the alternating current magnetic field-transferring portion 26A of the auxiliary coil 26 and the width Mpw of the tip end of the main magnetic pole 20. However, the recording elements 92A of the recording layer 92 are formed only in portions corresponding to the tracks. Therefore, even when the effective recording width Eww is not exactly the same as a width Tw of the recording elements 92A, the magnetization of the recording elements 92A can be reversed over the entire portion in the width direction by increasing the effective recording width Eww to be larger than Tw. Furthermore, guard band portions adjacent to the tracks are filled with the non-magnetic material 94, and thus the recording layer 92 is not present therein. Therefore, only portions corresponding to the tracks can be reliably magnetized.

Accordingly, the recording accuracy of data can be made high, and the processing accuracy of the auxiliary coil 26 and the main magnetic pole 20 can be reduced. Therefore, the productivity of the auxiliary coil 26 and the main magnetic pole 20 can be increased.

A description will now be given of an eleventh exemplary embodiment of the present invention.

Figure 14:
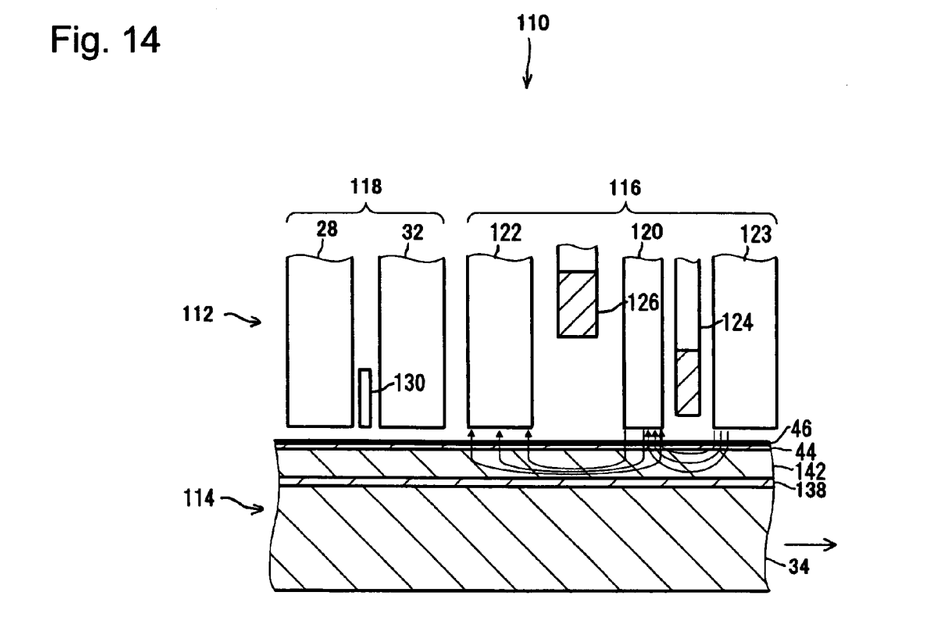
FIG. 14 is a side view including a cross sectional view schematically showing the general structure of a magnetic recording and reproducing apparatus according to an eleventh exemplary embodiment of the present invention.

As shown in FIG. 14, in the configuration of a magnetic recording and reproducing apparatus 110 according to the eleventh exemplary embodiment, a recording head 116 of a magnetic head apparatus 112 is configured to include: a main magnetic pole 120; a recording-side front-end shield (a return magnetic pole) 122; a main coil 124 for generating a longitudinal recording magnetic field at the main magnetic pole 120; and an auxiliary coil 126 for generating a perpendicular alternating current magnetic field having a frequency in a microwave band at the main magnetic pole 120. A magnetic recording medium 114 is of a longitudinal recording type. A recording layer 142 has a longitudinal magnetic anisotropy energy of $1 \times 10^6$ erg/cc and is configured to be magnetized in a longitudinal direction. A seed layer 138 is provided for increasing the magnetic anisotropy of the recording layer 142 in a longitudinal direction. A soft magnetic layer is not provided below the recording layer 142. Since the configuration of the other components is the same as that of the first exemplary embodiment, the same reference numerals as those employed in FIG. 1 are employed for the same components, and the description thereof will be omitted.

The main coil 124 is disposed between the main magnetic pole 120 and a recording-side rear-end shield (a return magnetic pole) 123.

Meanwhile, the auxiliary coil 126 is disposed between the main magnetic pole 120 and the recording-side front-end shield 122. The gap between the main magnetic pole 120 and the recording-side front-end shield 122 is larger than the gap between the main magnetic pole 120 and the recording-side rear-end shield 123. Therefore, the magnetic field generated by the auxiliary coil 126 and passing between the main magnetic pole 120 and the recording-side front-end shield 122 penetrates, in the direction generally perpendicular to the surface of the magnetic recording medium 114, at least a portion of the recording layer 142 which portion is close to the magnetic head apparatus 112.

A reproducing head 118 is configured such that a magnetic-resistance element 130 detects a reproducing magnetic field in a longitudinal direction.

In the magnetic recording and reproducing apparatus 110, when a direct current is supplied to the main coil 124, a direct current magnetic field is generated at the main coil 24. This direct current magnetic field passes through the main magnetic pole 120, the magnetic recording medium 114, and the recording-side rear-end shield 123, and the longitudinal recording magnetic field is applied to the recording layer 142 of the magnetic recording medium 114.

On the other hand, when an auxiliary coil-use electrical circuit similar to the auxiliary coil-use electrical circuit 47 supplies to the auxiliary coil 126 an alternating current having a frequency in the microwave band in the range of 1 to 15 GHz, the auxiliary coil 126 generates an alternating current magnetic field. As described above, the alternating current magnetic field generated by the auxiliary coil 126 penetrates, in the direction generally perpendicular to the surface of the magnetic recording medium 114, at least a portion of the recording layer 142 which is close to the magnetic head apparatus 112. Furthermore, the alternating current magnetic field passes through the main magnetic pole 120, the recording layer 142, and the recording-side front-end shield 122.

Hence, by applying the perpendicular alternating current magnetic field having a frequency in the microwave band to the recording layer 142, the required longitudinal direction-recording magnetic field of the recording layer 142 can be significantly reduced. Therefore, although the material for the recording layer 142 has a longitudinal magnetic anisotropy energy of $1 \times 10^6$ erg/cc or more and the coercive force of the recording layer 142 is high, the magnetization of a target recording portion of the recording layer 142 can be reversed or erased by applying the longitudinal recording magnetic field.

In the first to seventh exemplary embodiments and the ninth to eleventh exemplary embodiments, the recording-side front-end shield 22 or 122 is provided separately from the reproducing-side rear-end shield 32. However, the recording-side front-end shield may also serve as the reproducing-side rear-end shield.

Moreover, in the first to tenth exemplary embodiments, below the recording layer 42, 80 or 92 are formed the seed layer 40, the soft magnetic layer 38, and the underlayer 36. However, the configuration of the layers below the recording layer 42 may be appropriately changed according to the type of a magnetic recording and reproducing apparatus. For example, one or two layers among the underlayer 36, the soft magnetic layer 38, and the seed layer 40 may be omitted. Furthermore, each of the above layers may be composed of a plurality of layers. Moreover, the magnetic recording layer 42 may be formed directly on the substrate 34. The same can be applied to the configuration of the layers below the recording layer 142 of the eleventh exemplary embodiment.

Moreover, in the first to eleventh exemplary embodiments, the magnetic recording medium 14 or 114 is of a single layer recording type in which the magnetic recording layer 42, 80, 92 or 142 is formed on a single side of the substrate 34. However, various exemplary embodiments of the present invention are applicable to a magnetic recording medium of a double layer recording type in which magnetic recording layers are formed on the both sides of a substrate. In this case, the magnetic head apparatuses are disposed on both sides of the magnetic recording medium.

Furthermore, in the first to eleventh exemplary embodiments, the material for each of the recording layers 42, 92, and 142 and the material for the lower recording layer 80B area CoCrPt alloy. However, various exemplary embodiments of the present invention are also applicable to a recording layer formed of, for example, other alloys containing iron group elements (Co, Fe (iron), and Ni) or other materials such as a laminate thereof. In particular, various exemplary embodiments of the invention are applicable to a recording layer formed of a high magnetic anisotropy material such as a CoPt-based or FePt-based ordered alloy or a Co/Pd or Co/Pt multilayer film.

The present invention can be utilized in a magnetic head apparatus for recording magnetic data in a recording layer having high coercive force and in a magnetic recording and reproducing apparatus provided with the magnetic head apparatus.

What is claimed is:

1. A magnetic head apparatus comprising
   a recording head including:
   a main magnetic pole;
   a return-magnetic pole;
   a main coil for generating a perpendicular recording magnetic field at the main pole; and
   an auxiliary coil for generating a longitudinal alternating current magnetic field having a frequency in a microwave band at the main pole.

2. The magnetic head apparatus according to claim 1, wherein a part of the auxiliary coil is disposed between the main magnetic pole and the return magnetic pole.

3. The magnetic head apparatus according to claim 2, wherein the auxiliary coil has an alternating current magnetic field-transferring portion provided at a position facing the main magnetic pole, the alternating current magnetic field-transferring portion having a generally constant cross sectional shape perpendicular to a width direction and being generally parallel to the width direction, the area of the cross sectional shape being less than that of the rest of the auxiliary coil, and wherein the width of the alternating current magnetic field-transferring portion is less than that of a tip end of the main magnetic pole.

4. The magnetic head apparatus according to claim 2, wherein the auxiliary coil has an alternating current magnetic field-transferring portion provided at a position facing the main magnetic pole, the alternating current magnetic field-transferring portion having a generally constant cross sectional shape perpendicular to a width direction of the main magnetic pole and being generally parallel to the width direction, the area of the cross sectional shape being less than that of the rest of the auxiliary coil, and wherein a width of a tip end of the main magnetic pole is less than that of the alternating current magnetic field-transferring portion of the auxiliary coil.

5. The magnetic head apparatus according to claim 2, comprising an auxiliary coil-use electrical circuit which is provided for supplying an alternating current to the auxiliary coil and includes the auxiliary coil, wherein the auxiliary coil-use electrical circuit has an impedance adjusting element which is at least one of a capacitor and a inductor, and wherein a resonance frequency of the auxiliary coil-use electrical circuit is brought closer to a ferromagnetic resonance frequency of a recording layer of a magnetic recording medium serving as a recording target than a resonance frequency of a virtual electrical circuit formed by removing the impedance adjusting element from the auxiliary coil-use electrical circuit.

6. The magnetic head apparatus according to claim 2, wherein further comprising an auxiliary coil driving unit for supplying to the auxiliary coil an alternating current having a frequency in the range of 1 to 15 GHz.

7. The magnetic head apparatus according to claim 2, wherein a maximum value of the longitudinal alternating current magnetic field is less than a maximum value of the perpendicular recording magnetic field.

8. The magnetic head apparatus according to claim 2, wherein further comprising a reproducing head having a magnetic-resistance element which is one of a TMR element and a GMR element.

9. A magnetic recording and reproducing apparatus comprising:
   the magnetic head apparatus according to claim 2; and
   a perpendicular magnetic recording medium having a recording layer and a soft magnetic layer.

10. The magnetic recording and reproducing apparatus according to claim 9, wherein a material forming the recording layer of the magnetic recording medium has a perpendicular magnetic anisotropy energy of $1 \times 10^6$ erg/cc or more.

11. The magnetic head apparatus according to claim 1, wherein the auxiliary coil has an alternating current magnetic field-transferring portion provided at a position facing the main magnetic pole, the alternating current magnetic field-transferring portion having a generally constant cross sectional shape perpendicular to a width direction and being generally parallel to the width direction, the area of the cross sectional shape being less than that of the rest of the auxiliary coil, and wherein the width of the alternating current magnetic field-transferring portion is less than that of a tip end of the main magnetic pole.

12. The magnetic head apparatus according to claim 11, comprising an auxiliary coil-use electrical circuit which is provided for supplying an alternating current to the auxiliary coil and includes the auxiliary coil, wherein the auxiliary coil-use electrical circuit has an impedance adjusting element which is at least one of a capacitor and a inductor, and wherein a resonance frequency of the auxiliary coil-use electrical circuit is brought closer to a ferromagnetic resonance frequency of a recording layer of a magnetic recording medium serving as a recording target than a resonance frequency of a virtual electrical circuit formed by removing the impedance adjusting element from the auxiliary coil-use electrical circuit.

13. The magnetic head apparatus according to claim 1, wherein the auxiliary coil has an alternating current magnetic field-transferring portion provided at a position facing the main magnetic pole, the alternating current magnetic field-transferring portion having a generally constant cross sectional shape perpendicular to a width direction of the main magnetic pole and being generally parallel to the width direction, the area of the cross sectional shape being less than that of the rest of the auxiliary coil, and wherein a width of a tip end of the main magnetic pole is less than that of the alternating current magnetic field-transferring portion of the auxiliary coil.

14. The magnetic head apparatus according to claim 13, comprising an auxiliary coil-use electrical circuit which is provided for supplying an alternating current to the auxiliary coil and includes the auxiliary coil, wherein the auxiliary coil-use electrical circuit has an impedance adjusting element which is at least one of a capacitor and a inductor, and wherein a resonance frequency of the auxiliary coil-use electrical circuit is brought closer to a ferromagnetic resonance frequency of a recording layer of a magnetic recording medium serving as a recording target than a resonance frequency of a virtual electrical circuit formed by removing the impedance adjusting element from the auxiliary coil-use electrical circuit.

15. The magnetic head apparatus according to claim 1, comprising an auxiliary coil-use electrical circuit which is provided for supplying an alternating current to the auxiliary coil and includes the auxiliary coil, wherein the auxiliary coil-use electrical circuit has an impedance adjusting element which is at least one of a capacitor and a inductor, and wherein a resonance frequency of the auxiliary coil-use electrical circuit is brought closer to a ferromagnetic resonance frequency of a recording layer of a magnetic recording medium serving as a recording target than a resonance frequency of a virtual electrical circuit formed by removing the impedance adjusting element from the auxiliary coil-use electrical circuit.

16. The magnetic head apparatus according to claim 1, wherein further comprising an auxiliary coil driving unit for supplying to the auxiliary coil an alternating current having a frequency in the range of 1 to 15 GHz.

17. The magnetic head apparatus according to claim 1, wherein a maximum value of the longitudinal alternating current magnetic field is less than a maximum value of the perpendicular recording magnetic field.

18. The magnetic head apparatus according to claim 1, wherein further comprising a reproducing head having a magnetic-resistance element which is one of a TMR element and a GMR element.

19. A magnetic recording and reproducing apparatus comprising:
the magnetic head apparatus according to claim 1; and
a perpendicular magnetic recording medium having a recording layer and a soft magnetic layer.

20. The magnetic recording and reproducing apparatus according to claim 19, wherein a material forming the recording layer of the magnetic recording medium has a perpendicular magnetic anisotropy energy of $1 \times 10^6$ erg/cc or more.

* * * * *